Patented Feb. 16, 1943

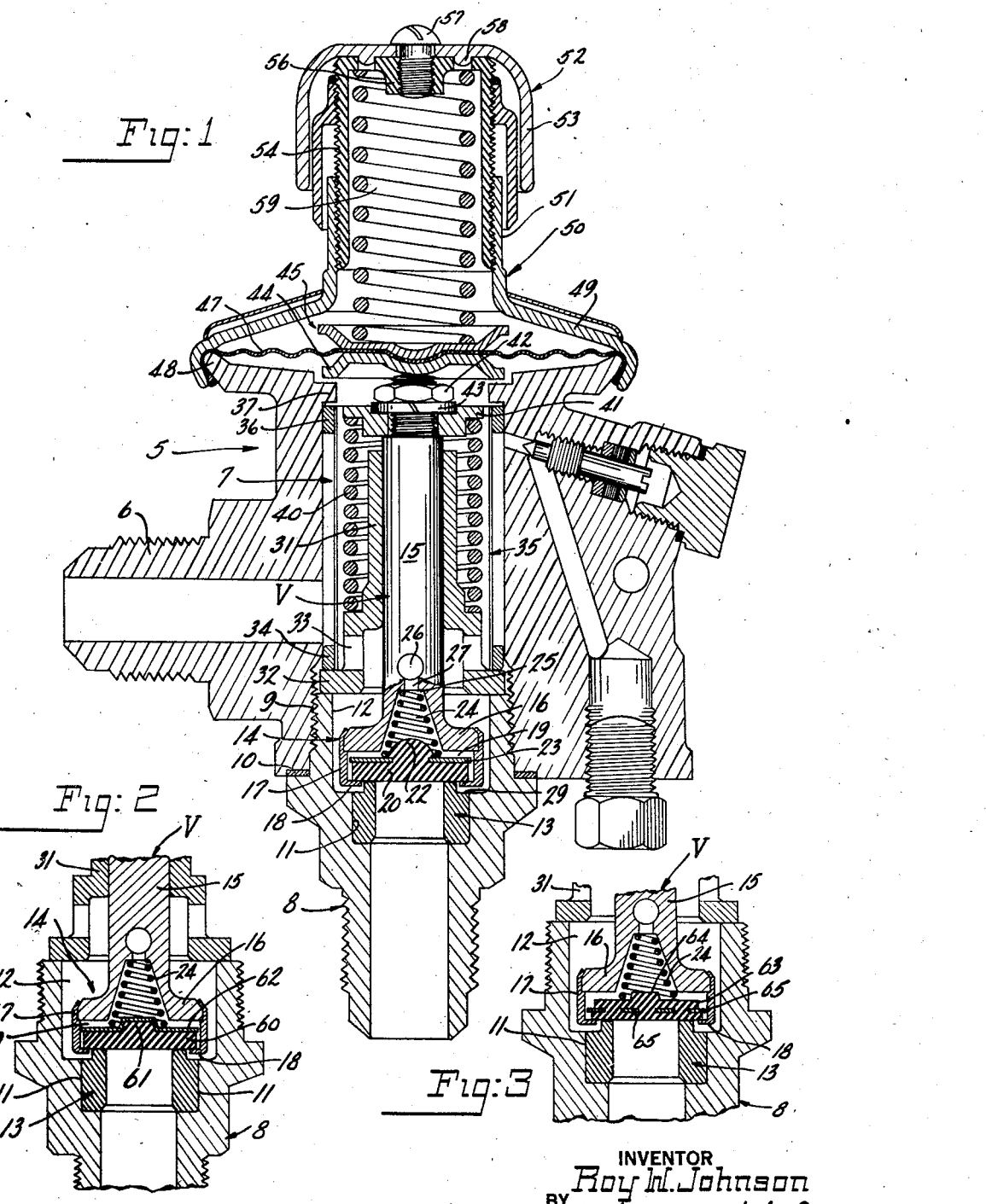

2,311,110

UNITED STATES PATENT OFFICE 2,311,110

VALVE

Roy W. Johnson, Milwaukee, Wis.

Application December 9, 1940, Serial No. 369,267

2 Claims. (Cl. 137—153)

This invention relates in general to valves and particularly to valves of the type in which the valve is seated or closed under heavy pressure and wherein the valve proper is constituted of elastic material, such as neoprene, synthetic rubber, rubber, or other similar material and is subjected in use to the action of oil, refrigerant, or other fluids which tend, along with the pressure, to distort the valve and impair its capacity to function efficiently and especially to shut off the flow completely when the valve is closed.

Valves of this character are employed in various fields. One typical use is in vapor compression refrigerating machines wherein such a valve is incorporated in the suction line between the evaporator coil and the compressor. Under the influence of the heavy pressure by which the valve is closed, and under the influence of oil and of the refrigerant, which envelops the same, the valve members proper, constituted as they usually are of neoprene, rubber, or some similar material, frequently swell or distort to such an extent that the valve will not shut off. In this use the problem is aggravated by the fact that a diaphragm is frequently employed as the instrumentality to close the valve, and the requirement is such that the diaphragm has a limited amount of travel. When the valve is distorted, the diaphragm, due to its limited travel or throw, becomes ineffective to close the valve.

In carrying out the present invention the valve is constituted of a valve stem operatively interconnected in any suitable way with the diaphragm, and is provided at its opposite end with a chambered or socketed head in which the valve proper floats in a controlled and limited fashion but to such an extent as to accommodate any swelling or distortion of the valve proper. The side of the chambered head that confronts the valve seat is provided with a flanged opening, the flange surrounding and clearing the valve-engaging surface of the valve seat so that such surface is engaged only by the valve proper. The flanged end of the chambered head of the valve is, however, engageable with a rigid portion of the valve which may be part of the structure that constitutes the seat or part of the support therefor, and which functions as a stop to limit the extent to which the valve as a whole may travel. Between a wall of the chamber and the valve proper a spring is interposed and biases the valve into engagement with its seat when the head of the valve is moved to valve-closing position. The force which this valve spring exerts is independent of the force impressed on the valve by the diaphragm and may be made sufficiently light to accomplish this purpose without distorting the valve or its seat.

Other objects and advantages reside in certain novel features of the construction, arrangement, and combination of parts which will be hereinafter more fully described and particularly pointed out in the appended claims, reference being had to the accompanying drawing forming a part of this specification, and in which:

Figure 1 is a view in central, vertical, longitudinal cross section showing the valve embodying the present invention and incorporated in a suction pressure-regulating valve; and Figures 2 and 3 are fragmentary sectional views illustrating modifications of structural variants of the valve shown in Figure 1.

Referring to the drawing, the numeral 5 designates the body of the valve. Integral with the body of the valve is an inlet fitting 6 which is externally threaded to adapt it to be connected up to the tail or outlet end of an evaporator coil of a vapor compression refrigerating machine (not shown). Internally the valve is provided with a chamber 7 with which the inlet 6 is in open communication. An outlet fitting 8 is threaded into the lower end of this chamber 7, as indicated at 9. A washer 10, interposed between the flange of the fitting 8 and the valve body 5, hermetically seals the connection between these parts. The outlet fitting 8 is also externally threaded to adapt it to be connected to the suction side of the compressor (not shown).

The upper end of the outlet fitting 8 is provided with two counter-bores 11 and 12, the counter-bore 11 being adapted to have a valve seat 13 fitted therein and secured thereto, and the counter-bore 12 accommodating the head of the valve, the head being designated generally at 14 and the valve being designated as a whole by the reference character V. The valve V is made up of a valve stem 15 having its lower end provided with a flange 16. A sleeve 17 has one end spun over or otherwise suitably secured to the flange 16 and has its lower end provided with an inturned annular flange 18. The flange 16 of the valve V and the sleeve 17 provide the head of the valve, the flange sleeve, and the flange 16, providing a socket or chamber 19 in the head of the valve. In this chamber 19 a disc valve 20 of neoprene, synthetic rubber, rubber composition, or other similar or suitable material, is floatably mounted, these parts being dimensioned and proportioned so that there is clearance not only for bodily movement of the valve axially in the valve chamber, but also so that there is clearance between the outside circumference of the valve and the sleeve 17.

In the form of the invention shown in Figure 1 the upper side of the valve disc has a boss or protuberance 22, and surrounding this protuberance, to strengthen and stiffen the valve, is a metal disc or washer 23. A coil spring 24 is disposed between the top side of the valve disc 22 and the spring abutment 25 provided therefor in the valve stem, the lower end of the spring surrounding and being centered by the boss or protuberance 22. In order that the pressure may be active on the valve proper to tend to close the same, the valve stem 15 is provided with a transverse opening 26 intersected by a short axial opening 27 which leads into the valve chamber. The flange 18 of the sleeve 17 surrounds or clears the active face of the valve seat but is engageable with stop structure 29 which may be constituted by a portion of the valve seat or by a portion of the outlet fitting 8, or by both. When the flange 18 engages this stop structure the movement of the valve as a whole toward the valve seat is positively stopped, but the valve disc 20 is still free to move under the action of its own spring.

The valve stem may be operatively interrelated in any suitable way with the thermostat or diaphragm which is provided to control its action. Only one way is illustrated in the drawing but this is for purposes of illustration only. In the construction illustrated the stem 15 of the valve is slidably fitted in a tubular valve guide 31. The lower end of the valve guide 31 is enlarged and flanged as at 32, and the enlarged portion thereof has circumferential openings, as at 33, to provide for communication between the valve chamber 7 and the counter-bore space 12 which accommodates the head of the valve. The underside of the flange of the enlarged end 32 of the valve guide is engaged between the upper end of the outlet fitting 8 and the lower ring 34 of a strainer, designated generally as at 35. The upper ring 36 of the strainer engages an inwardly directed shoulder 37 integrally formed with the valve body at the upper end of the valve chamber 7. The reticulated body portion of the strainer is suitably connected to the rings 34 and 36.

A coil spring 40 encircles the valve guide 31 and has its lower end abutting the enlarged portion 32 thereof and its upper end abutting a flanged washer 41 secured by a nut 42 and lock washer 43 to the upper end of the valve stem. The spring 40 is under compression and presses the upper end of the valve stem 15 against the lower section or member 44 of a pressure pad, designated generally at 45, and suitably fixed to the central portion of a diaphragm 47, whereby to cause the valve stem 15 and its head 14 to follow and be controlled by the diaphragm.

The periphery of the diaphragm 47 is clamped between the upwardly inclined peripheral portion of a flange 48 integral with the upper end of the valve body 15 and a downwardly and inwardly directed peripheral portion 49 of a diaphragm or casing member 50. The portion 49 of the diaphragm casing member 50 is spun or rolled into secure mechanical engagement and hermetic sealing relationship with the periphery of the flange 48. The body of the casing 50 is provided with a vertical cylindrical or tubular extension 51 which is internally threaded.

An adjusting knob, designated generally at 52, is provided and includes a cap 53. An externally threaded sleeve 54 is combined with the cap 53 and has its lower end open and its upper end closed. The upper closed end of the sleeve 54 fits against the under side of the top of the cap and is rigidly interconnected therewith by virtue of provision of dowel pins 55 which may be formed integrally with the under side of the cap and which will project into the openings provided therefor in the upper end of the sleeve 45. Centrally the upper closed end of the sleeve is formed with an internally threaded bushing 56. A screw 57 has its head engaged with the top of the cap and has its threads interengaged with the bushing 56. The external threads of the sleeve 54 are interthreaded with the internal threads of the extension 51 of the diaphragm casing. A spring 58 is interposed between the upper member of the diaphragm pressure pad 45 and the under side of the closed upper end of the sleeve. By turning the knob the compression of the spring 58 may be varied.

The other details of the suction pressure regulating valve per se shown in the drawing form no part of the present invention and are fully disclosed and claimed in the application of Ferd F. Heiser, filed July 22, 1940, Serial No. 346,725, for "Suction pressure-regulating valves," and assigned to the Automatic Products Company, of Milwaukee, Wisconsin, with which applicant is associated.

The form of the invention shown in Figure 2 is identical with that described except in respect of the construction of the valve disc proper. As in the other embodiment of the invention, this disc, designated at 60, is of neoprene, rubber, or the like, and it has a forwardly directed centered boss or protuberance 61, but this metallic reinforcing washer, designated at 62, is cupped so as to overlie not only the top surface of the disc but also of the boss or protuberance.

In the form of the invention shown in Figure 3 the structure of the valve is further modified. As there shown, the disc is designated at 63 and has an upwardly directed boss or protuberance 64, but the valve disc, designated at 65, and which is perforated, is moulded in the body of the disc.

While I have shown and described several constructions in which the invention may be advantageously embodied, it is to be understood that the constructions shown have been selected merely for the purpose of illustration or example, and that various changes in the size, shape, and arrangement of the parts may be made without departing from the spirit of the invention or the scope of the subjoined claims.

I claim:

1. A control valve comprising a valve body having a chamber, an inlet port to said chamber, an outlet port for said chamber, an upwardly facing valve seat in said outlet port, a valve positioned in said chamber, said valve including a valve stem having a chambered head at one end, a spring on said stem for urging said valve in one direction, a valve disc loosely mounted in said chambered head and having a flat face engageable with said upwardly facing valve seat, a spring within said chambered head urging said disc toward said seat, a passageway extending from the exterior of said stem to the interior of said chambered head to establish constant communication between said inlet port and the surface of said disc opposite said flat face, and a pressure operated diaphragm associated with said stem for operating said valve.

2. A control valve comprising a valve body having a chamber, an inlet port to said chamber, an outlet port for said chamber, an upwardly facing valve seat in said outlet port, a valve positioned in said chamber, said valve including a valve stem having a chambered head at one end, a spring on said stem for urging said valve in one direction, a valve comprising a disc of soft material having a flat face engageable with said upwardly facing valve seat, said disc having a boss on the side opposite said flat face, a metal washer surrounding said boss to stiffen said disc, said disc being loosely mounted in said chambered head, a spring within said chambered head having one end surrounding said boss and urging said disc toward said seat, a passageway extending from the exterior of said stem to the interior of said chambered head to establish constant communication between said inlet port and the surface of said disc opposite said flat face, and a pressure operated diaphragm associated with said stem for operating said valve.

ROY W. JOHNSON.